United States Patent
Maile (10) Patent No.: US 8,944,895 B2
(45) Date of Patent: Feb. 3, 2015

(54) METHOD FOR FILLING SAUSAGES WITH A PASTE-LIKE SUBSTANCE AND FILLING MACHINE FOR PERFORMING THIS METHOD

(71) Applicant: Albert Handtmann Maschinenfabrik GmbH & Co. KG, Biberach (DE)

(72) Inventor: Bernd Maile, Oggelshausen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 190 days.

(21) Appl. No.: 13/745,334

(22) Filed: Jan. 18, 2013

(65) Prior Publication Data

US 2013/0210326 A1 Aug. 15, 2013

(30) Foreign Application Priority Data

Feb. 15, 2012 (EP) .................................. 20120155591

(51) Int. Cl.
  *A22C 11/00* (2006.01)
  *A22C 11/02* (2006.01)

(52) U.S. Cl.
  CPC .................................. *A22C 11/0245* (2013.01)
  USPC .......................................................... 452/31

(58) Field of Classification Search
  USPC ............ 452/21–26, 30–32, 35–37, 46–48, 51
  See application file for complete search history.

(56) References Cited

U.S. PATENT DOCUMENTS

| | | | | |
|---|---|---|---|---|
| 3,631,565 A | * | 1/1972 | Muller ............................. | 452/41 |
| 4,164,057 A | * | 8/1979 | Frey et al. ....................... | 452/38 |
| 4,347,646 A | * | 9/1982 | Staudenrausch ................ | 452/31 |
| 5,069,608 A | * | 12/1991 | Rather ........................... | 418/261 |
| 5,102,314 A | * | 4/1992 | Staudenrausch ................ | 418/15 |
| 5,380,240 A | * | 1/1995 | Staudenrausch ................ | 452/41 |
| 5,720,603 A | * | 2/1998 | Miller et al. ................... | 418/180 |
| 5,951,391 A | * | 9/1999 | Hergott et al. .................. | 452/46 |
| 6,117,003 A | * | 9/2000 | Brinson .......................... | 452/31 |
| 7,785,177 B2 | * | 8/2010 | Plewa et al. .................... | 452/30 |
| 2008/0299885 A1 | * | 12/2008 | Maile et al. ..................... | 452/31 |

FOREIGN PATENT DOCUMENTS

| | | |
|---|---|---|
| DE | 202011000207 U1 | 3/2011 |
| EP | 0013552 A1 | 7/1980 |
| EP | 1488702 A1 | 12/2004 |
| EP | 1623628 A2 | 2/2006 |
| EP | 1997384 A1 | 12/2008 |

OTHER PUBLICATIONS

European Search Report for Application No. EP12155591, dated Jun. 20, 2012.

* cited by examiner

*Primary Examiner* — Richard Price, Jr.
(74) *Attorney, Agent, or Firm* — Marshall, Gerstein & Borun LLP (57) ABSTRACT

A method for filling sausages with a paste-like substance by means of a filling machine and to a filling machine for performing this method, including a sensor unit capable of determining at least one parameter that varies differently for different paste-like substances as a function of time. Depending on the at least one determined parameter, a controller determines whether a measure to be implemented on one or more wearing parts is necessary, the wearing parts wearing out at different times depending on the different paste-like substances.

16 Claims, 5 Drawing Sheets

METHOD FOR FILLING SAUSAGES WITH A PASTE-LIKE SUBSTANCE AND FILLING MACHINE FOR PERFORMING THIS METHOD

CROSS-REFERENCE TO RELATED APPLICATION

The present application claims the benefit of priority of European Application No. 12155591.6, filed Feb. 15, 2012. The entire text of the priority application is incorporated herein by reference.

FIELD OF THE DISCLOSURE

The disclosure relates to a method for filling sausages with a paste-like substance by means of a filling machine and to a filling machine for performing this method.

BACKGROUND

In the field of food technology, and especially also in the production of sausages, highest quality standards and hygiene standards are required. For this reason, the maintenance standards are high and frequent maintenance intervals are fixed. Once the maintenance time is reached (e.g. every 2000 operating hours) the previously determined maintenance work is carried out and the designated components are exchanged. In spite of all precautionary measures hygiene problems or damages may occur for unknown reasons, and with it production losses and a reduced quality.

SUMMARY OF THE DISCLOSURE

Based on the foregoing it is one aspect of the present disclosure to provide a method and a filling machine which ensure a reliable production of sausages.

In connection with the present disclosure it was found that structurally identical machines and apparatus are used in practice for different paste-like substances, so that the machines are subjected to very different loads. Different paste-like substances are substances of different compositions, consistencies or temperatures, which lead to different process conditions. This means, depending on the paste-like substance used and the different process conditions wearing parts in different machines wear out at different times. Thus, it is impossible for a producer to fix a time when specific measures have to be taken for a wearing part.

In this respect, the proper function of the conveyor of the filling machine is of particular importance, by means of which the paste-like substance is pushed from a hopper into a filling pipe, through which, again, the paste-like substance is ejected into sausage casings.

However, according to the present disclosure a sensor unit is provided, which determines at least one parameter that varies differently for different paste-like substances as a function of time, wherein, depending on the at least one determined parameter, a controller determines whether a measure to be implemented on or for one or more wearing parts is necessary, the wearing parts wearing out at different times depending on the type of the paste-like substance. Thus, a proper operation can be ensured, no matter how the filling machine is, in effect, operated outside the factory. Consequently, damages to the produced sausage and extensive damages to the filling machine or respective attachments can thus be effectively prevented. The availability of the machine can be increased by detecting looming problems in time. The service life of the machine is increased, inter alia, because the maintenance is carried out at the required time and necessary repairs are realized in time and reliably.

Preferably, the controller detects a deviation of at least one measured parameter from a respective set value or set value range. The set value or set value range, respectively, is factory-set, regardless of the paste-like substance used later and the operating parameters resulting therefrom.

According to a preferred embodiment the controller is configured to determine a point in time for the required measure on the basis of the at least one determined parameter. To this end, for instance, specific maintenance times or time windows and measures for specific wearing parts are stored in the controller for specific parameter values or parameter ranges, which measures can then be displayed.

To this end, an acoustic indicator or visual display is preferably provided, which displays visually or indicates acoustically that a corresponding measure is required if this has been determined by the controller. Alternatively or additionally, the data may also be stored or transmitted to a central computer, or they may be passed on to an external visual or acoustic device. For instance, the information may be transmitted to a customer service.

It is a particular advantage if it is determined by the controller whether measures to be implemented on conveyor components are necessary, in particular on the rotor, the blades and/or at least one sealing. The proper function of the conveyor is very important for the later product quality of the produced sausages, in particular for the accurate weight and impeccable product hygiene.

One important parameter for determining whether a measure to be implemented on a wearing part is necessary, in particular on a conveyor, is, for instance, the measurement of the pressure in and/or downstream of the conveyor. If the blades are worn out, or if the conveyor sealing(s) is (are) worn out, the pressure decreases as the operation time increases. Therefore, this parameter serves to determine in an easy way the time when a measure to be implemented on the conveyor is necessary, e.g. an exchange of the sealings, an adjustment of the tensioning eccentric of the vane pump.

Also, the torque acting on the rotor or rotor shaft may serve as a parameter, whose behavior or variation is monitored during the operating period. If the torque decreases it can be determined, for instance, that an adjustment measure to be implemented on the tensioning eccentric is necessary.

Moreover, the current consumption and/or power consumption of a drive, in particular of the conveyor, may be used as a parameter. In this case, for instance, the measurement values may be integrated as a function of time.

Finally, also the temperature of a motor, of the environment, of the paste-like substance or of operating supplies may be used as a parameter.

Also, a vibration measurement is feasible as a parameter in order to detect an imbalance of a bearing, e.g. of the bearing for the rotor shaft of the conveyor. The integrated measurement values of the speed of a drive, too, may be used as parameters, in particular of the conveyor drive, or the number of revolutions of the drive or the conveyor, respectively.

Another parameter may be the pressure difference between two measuring points in the conveyor, in particular between the suction area and the pressure area.

According to a preferred embodiment, if it is determined that the time for an automatic measure is reached, an emergency program is started or the machine is stopped. Thus, serious consequential damages and product variations can be prevented.

The controller comprises a memory in which corresponding points in time or time windows for measures to be implemented on one or more associated wearing parts or algorithms for the calculation thereof are stored for different parameters or parameter ranges. The points in time or time windows were determined and stored, for instance, experimentally.

The present disclosure will be explained in more detail below with reference to the following drawings.

DETAILED DESCRIPTION OF THE PREFERRED EMBODIMENT

Figure 1:
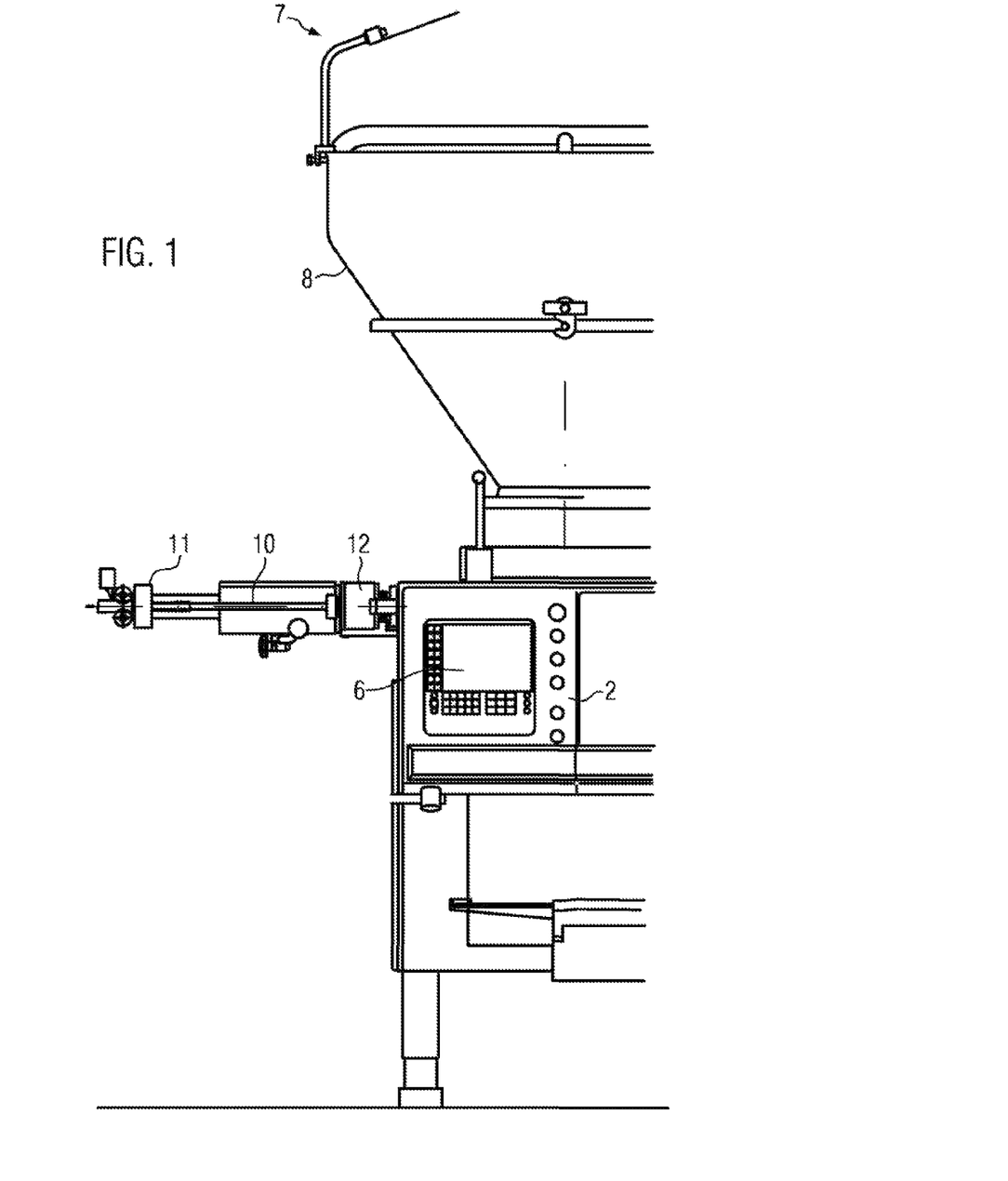
FIG. 1 roughly schematically shows the structure of a filling machine according to the present disclosure.
Figure 2A:
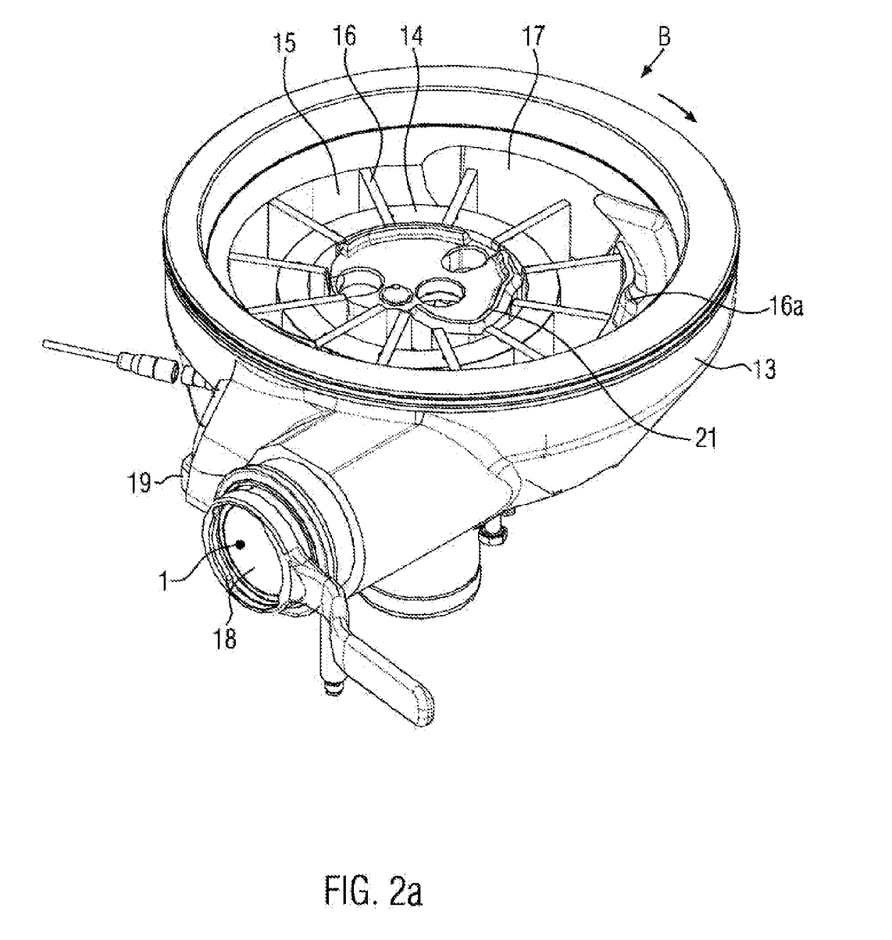
FIG. 2a roughly schematically shows the structure of a conveyor according to the present disclosure.

FIG. 1 shows a filling machine for the production of sausages according to the present disclosure. The filling machine is, for instance, a vacuum filling machine. A filling machine of this type comprises, for instance, a housing on whose upper side a filling hopper 8 is disposed, into which the paste-like substance, in particular sausage meat, is filled. A dosing device, e.g. the feeding device shown in FIG. 2, e.g. vane pump 9, is provided underneath the filling hopper 8. A filling pipe 10, which protrudes from the housing, joins the outlet of the conveyor, through which a paste-like substance is ejected into sausage casings in a manner known per se. At the rear end of the filling pipe 10, for instance, a twisting-off device 11 may be provided, which comprises a drive 12, for instance, for twisting the not yet filled sausage casing about its longitudinal axis together with the filling pipe. Thus, it is possible to produce, in a manner known per se, a point of separation in the form of a sausage plait. Various attachments may be attached to the filling machine, e.g. an inline grinder, a twisting line etc., which are likewise controlled by a controller 2 which also controls the functions of the filling machine. The conveyor 9, too, has a non-illustrated drive, i.e. a motor.

Figure 2B:
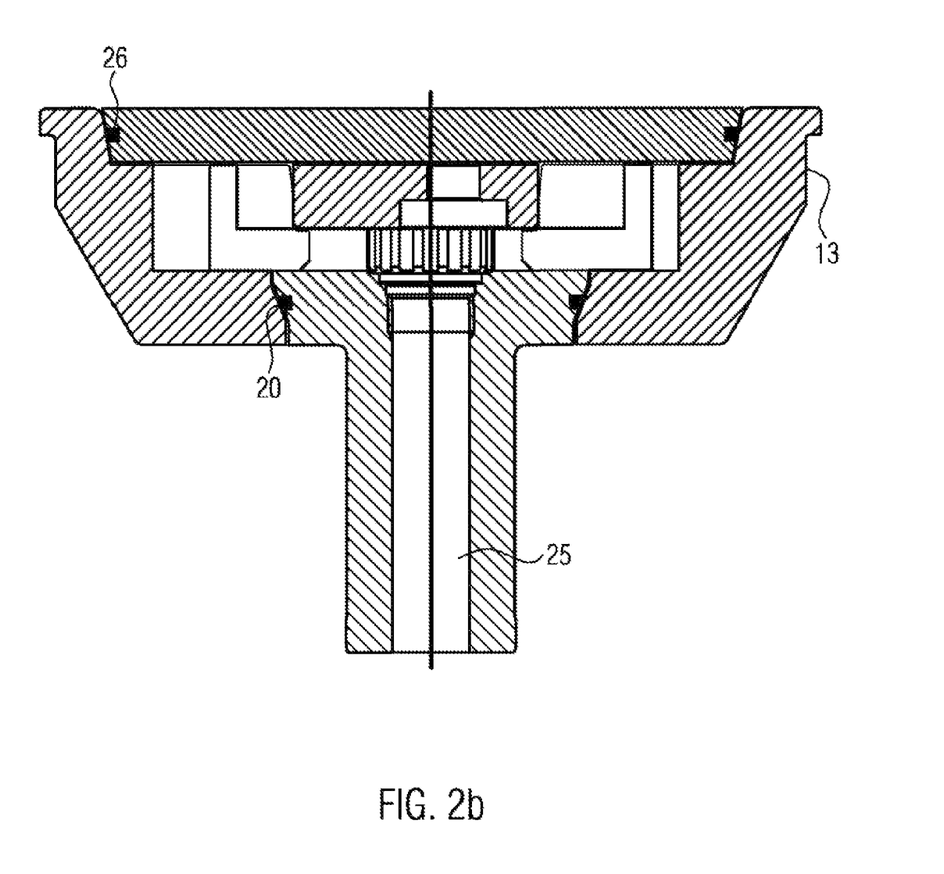
FIG. 2b roughly schematically shows the sealing between the housing and a drive.

FIG. 2 shows a possible structure of a conveyor in detail, in this case a vane pump. The vane pump is explained in more detail, for instance, in EP 1837524. The vane pump comprises a housing 13, a rotor 14 drivable by a non-illustrated drive shaft and a drive motor, as well as several vane cells 15 which are defined by radially extending blades 16. The vane pump has an inlet 17 for a paste-like substance, as well as an outlet 18. Furthermore, the vane pump may comprise a connection 19 for a vacuum pump. The upper side of the vane pump is sealingly closed by the cover plate and the sealing 26. 20 designates, for instance, a sealing which seals the rotor. As can be seen particularly in FIG. 2b, the sealing 20 constitutes a sealing to the outside between the housing 13 and a drive shaft device 25.

In practice, the above-described filling machine may be used for different paste-like substances, so that different machines are subjected to different loads. Different paste-like substances result in different process parameters, such as process speed, pressure in the filling hopper, pressure in the conveyor, temperature. Different consistencies of the paste-like substances, too, result in different loads for machine parts. This means that wearing parts in different machines wear out at different times depending on the paste-like substances used.

Of particular significance for the proper function of the filling machine is the proper function of the conveyor. In this respect, it is important that the sealings work properly, e.g. sealing 20, in order to prevent impurities from escaping in the direction of the paste-like substance, and in order to prevent pressure variations in the individual vane cells which, again, could lead to weight inaccuracies and quality losses. It is also important that the blades 16 are not worn out on their outwardly directed edges 16a and their upper and lower edges, for instance, to allow the sealing of the vane cell chambers in a sealing area provided between inlet 17 and outlet 18. In general, the vane pump can be divided into multiple areas. One of these areas is the suction area, another area is the pressure area or compression area, with a sealing area separating the compression area from the suction area. The outlet area in which the paste-like substance is ejected starts downstream of the compression area. The outlet area is joined by the sealing area which separates the pressure area from the suction area. The suction area starts at a point where the gap-like distance between the rotor and the inner wall of the pump housing increases such that the vane cell chambers become larger. The suction area extends up to the front end of the inlet.

Also the proper function of the rotor 14 is significant for the function of the vane pump.

Figure 4:
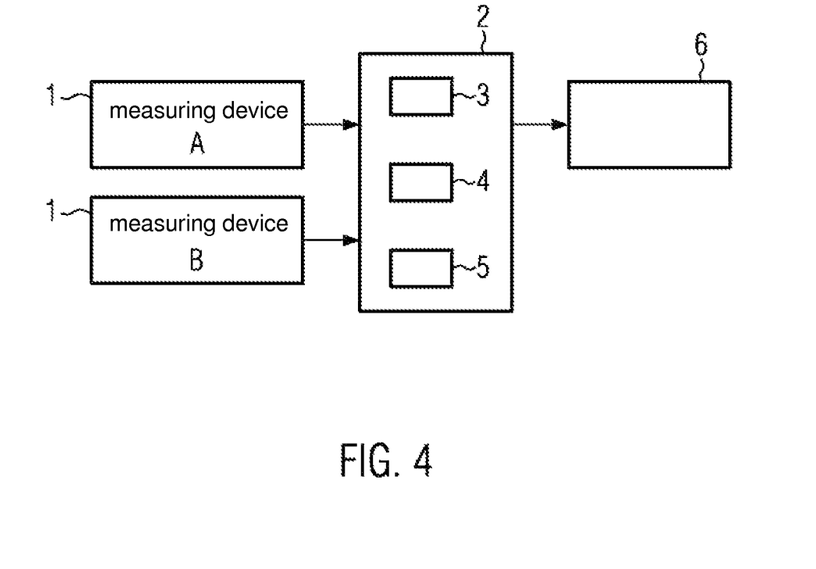
FIG. 4 roughly schematically shows a block diagram of the measuring device and controller and display according to the present disclosure.

According to the present disclosure, therefore, a sensor unit 1 is provided, which determines at least one parameter that varies differently for different paste-like substances as a function of time, wherein, depending on the at least one determined parameter, a controller determines whether a measure to be implemented in one or more wearing parts is necessary, said wearing parts wearing out at different times depending on the type of the paste-like substance.

As can also be seen, particularly, in FIG. 4, at least one measuring device 1 may be connected to the controller 2, which comprises, for instance, a comparing device 3 for detecting a deviation of at least one determined parameter from a respective set value or set value range. Also, it is possible by means of an integrator 4 to integrate measured values over time. Finally, the controller 2 comprises a memory 5 in which set values or set value ranges for different parameters and parameter ranges and corresponding points in time or time windows for measures to be implemented on one or more associated wearing parts or algorithms for the calculation thereof are stored. If it is determined that a measure will be necessary, a signal is transmitted to an acoustic indicator and/or a visual display 6 which displays a corresponding measure or measures for one or more wearing parts and, in addition, is able to predict the point in time or a specific time window. Whether and when a measure needs to be implemented on one or more wearing parts may, additionally or alternatively, also be stored and/or, for instance, transmitted to a central computer, and/or may be passed on to an external indicator and/or acoustic device. An external indicator and/or acoustic device allows the data to be passed on to a customer service.

In this specific embodiment the disclosure is explained in more detail by means of the conveyor 9. In order to assess the proper function of the conveyor, in this case the vane pump, a pressure sensor 1 is, therefore, disposed in the conveyor or in the production direction downstream of the conveyor. Preferably, the pressure sensor 1 is disposed between the inlet 17 for a paste-like substance and the outlet 18 inside the conveyor. If the sealing effect of the sealings, e.g. sealing 20, or the vane pump deteriorates, or if the blades 16 are worn out, the measured pressure drops.

The controller 2 can now detect a deviation from the determined parameter, in this case of the pressure from a set value or set value range. If a deviation is detected it is determined that one or more measures are necessary at a specific point in time or in a specific time window, which may be displayed in the display 6. In this case the measure indicated is, for instance, the exchange of the sealings, in particular sealing 20, and the servicing of the tensioning eccentric 21. As explained before, the rotor 14 comprises blades 16 which are mounted to be radially displaceable and which define the vane cells 15 with the inner contour of the pump housing or the inner wall, respectively, the bottom of the pump housing, the rotor wall and the cover disc or lid of the pump housing. The rotor 14 is disposed about a guiding device, in the present case the tensioning eccentric 21. Preferably, the tensioning eccentric 21 is arranged eccentrically in the pump housing. The tensioning eccentric has the function to guide the blades 16, which are mounted in the rotor 14 in a radially displaceable manner, corresponding to its outer guiding contour in a radial direction. This means that the position of the blades is defined, on the one hand, by inner contour of the pump housing and, on the other hand, by the guiding contour of the tensioning eccentric. The tensioning eccentric is mounted in a torque-proof manner. In case of a deviation from the measured parameter, e.g. the pressure, it is then determined that the outwardly directed end edges of the blades 16 in the pressure area or compression area are not in a tight-fitting contact with the inner wall of the housing. The compression area starts downstream of the inlet 17 in the direction of rotation, in a region in which the vane cell chambers decrease in size, i.e. in which the radius of the inner contour of the pump housing is reduced and the vane cells are closed by the blades. The tensioning eccentric 21 then has to be adjusted. To this end, the outer contour of the tensioning eccentric 21 is adjusted in an outward direction, thereby allowing the edges of the blades to fit again tightly against the inner wall of the housing. This can be accomplished, for instance, by a non-illustrated adjusting means, e.g. adjusting screws. In this case, the tensioning eccentric 21 is then formed, for instance, of two parts or multiple parts, and the outer contour can be obtained by changing the position of the tensioning eccentric segments relative to each other. Alternatively or additionally, it is also possible that the tensioning eccentric is mounted in such a way that its position can be adjusted in the radial direction, i.e. in the direction towards the pump housing, so as to readjust a corresponding guide contour. To this end, the tensioning eccentric can be mounted, for instance, to be adjustable in an oblong hole that extends outwardly in the direction of the pump housing. By shifting and fixing the tensioning eccentric in the oblong hole a specific position, and thus a specific location of the guide contour may be adjusted.

That is, if the tensioning eccentric is serviced, the tensioning eccentric 21 is readjusted. Thus, by measuring the pressure, it can be determined in a simple way when the corresponding measure is necessary. There is no fixed maintenance interval, but the filling machine, if used for different paste-like substances, is serviced exactly at the time when it is detected by the sensor unit that a proper operation can no longer be ensured. The set value range for the pressure in the pressure area and the pressure difference between the suction area and the pressure area at two measuring points is, for instance, between 10 and 15 bar, and is predefined by the producer irrespective of the later operating mode. The pressure measurement is, in this case, very easy and has advantages. Suited as pressure sensors are: electronic pressure sensors, difference pressure sensors etc.

Alternatively or additionally, also a device for detecting the torque which acts on the rotor 14 or the drive shaft thereof, respectively, may be provided. To this end, for instance, the torsion of the drive shaft may be measured, e.g. by means of strain gauges. The torque may vary as the operation time increases, which is indicative of worn out pump blades and which requires the following measure: readjustment of the tensioning eccentric.

Also, it is possible to provide a device for detecting the current and/or power consumption of a drive, in particular of the conveyor drive. In order to determine the parameter the measured values for the current and/or power consumption can be integrated over the operation time. In the event of a specific current and/or power consumption the controller 2 determines that, for instance, the following measures are necessary: exchange of the drive shaft bearing. To this end, for instance, the power control of the drive motor may be used.

Also, a device for detecting the temperature of the paste-like substance and/or the motor, in this case, for instance, of the conveyor drive, and/or of operating supplies, e.g. transmission oil, vacuum pump oil etc. may be provided. For instance, if the temperature of the paste-like substance or the motor is too high the paste-like substance may be damaged. The excessive temperature may result in an increased bearing clearance. A failure of the bearing is imminent. The following measure should then be initiated: Adjustment of the bearing clearance or exchange of the bearing. By this, a quality loss of the produced sausages and even greater consequential damages can be avoided. The set value range for the temperature of the paste-like substance is, for instance, in a range of −6° C. to +70° C.

Also, it is possible to provide a vibration measuring device in order to detect an imbalance of a bearing or a bearing damage, e.g. of the bearing for the drive shaft of the conveyor. For instance, the vibration measuring device may, in this case, be an acceleration sensor on three planes of motion in the interior space of the machine, arranged in the region of the bearing. The comparative parameter is the measured vibration value of a new bearing, wherein the set value range is represented by an empirical value obtained from machines with a low operational performance, which is stored in the machine memory. If a parameter deviation is detected, e.g. an imbalance, the time window or point in time for exchanging the bearing is displayed.

In addition, it is also possible to provide a device which supplies as a parameter the integrated measured values of the speed of the conveyor. The speed is obtained by the resolver or shaft encoder at the drive motor, or by position sensors at the conveyor sensing, for instance, the blades. Finally, there may also be provided a device for determining the number of revolutions of the drive, in the present case the conveyor. With the aid of these parameters, too, it can be determined that a servicing of the sealings or vane cells is necessary.

With regard to measured values which are integrated over the operation time the corresponding values remain stored in a memory of the controller, even if the filling machine is at a standstill.

In the above-described embodiment the measuring devices inside the filling machine for the conveyor were described.

The controller 2 also controls several attachments. Thus, on the basis of the above-described parameters, the controller 2 is also capable of drawing conclusions on the maintenance of wearing parts of the attachments, such as the inline grinder, twisting line etc., and corresponding measures to be implemented on the respective wearing parts, with a corresponding time indication, can be displayed as described above.

For instance, it is also possible to carry out a torque measurement for the twisting-off device 11, 12, as well as a measurement of the current and/or power consumption of the drive for the twisting-off device 11, 12, and a vibration measurement for the twisting-off device 11, 12, in order for a decision to be taken by the controller 2 that, if a deviation from a set value or set value range occurs, measures have to be implemented on the twisting-off device, as was described above in connection with the conveyor. Similarly, this may also be carried out for the following drives: lifting device, additional drive, vacuum pump etc.

Figure 3:
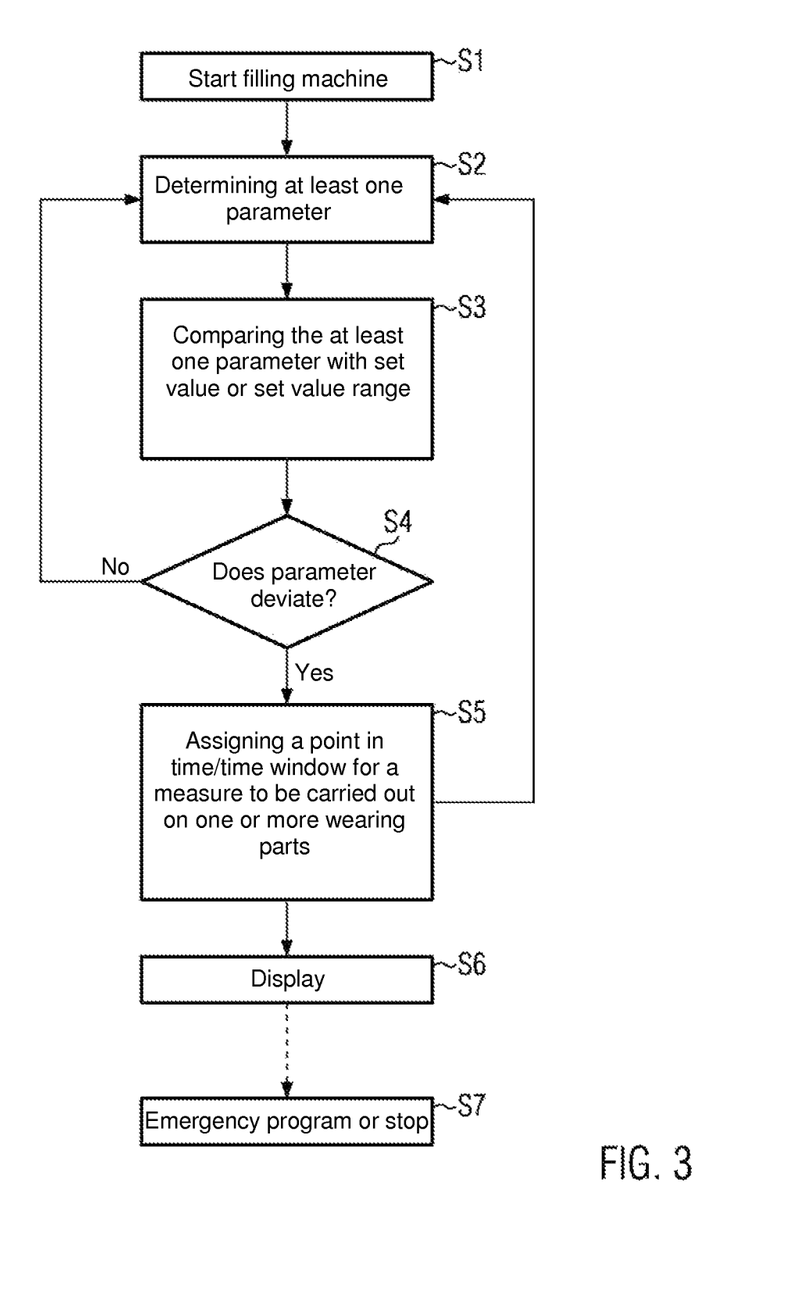
FIG. 3 shows a flow chart of the method according to the disclosure.

The method according to the disclosure will be explained in more detail below on the basis of FIG. 3.

The operation of the filling machine is started in step S1. At least one sensor unit 1 continuously determines at least one parameter during the operation (S2). The parameters are compared in a controller 2, for instance, with a set value or set value range.

In step S4 it is determined for each of the measured parameters whether it deviates from the set value or set value range. If it is determined that there is no deviation the monitoring of the corresponding parameter is continued. Nothing will be displayed, and there is no indication that a measure is necessary.

However, if it is detected that the parameter does deviate, a point in time or a time window for a specific measure to be implemented on one or more wearing parts can be assigned in a step S5. For instance, if the pressure measured in the conveyor cell has dropped too much, it will be determined when or in which time period measures are necessary, for instance, an exchange of the sealings (e.g. sealing 20) or the maintenance of the vane cells, a readjustment of the tensioning eccentric. To this end, a corresponding point in time or a corresponding time window for the measures to be implemented on one or more associated wearing parts is stored in the controller for different parameters or parameter ranges, or algorithms for the calculation are stored.

The controller 2 then transmits corresponding signals to a display which, in a step S6, displays the required measures and the point in time and/or the time window. If the operator carries out the corresponding maintenance the parameter (or more parameters) is adjusted and will be in the set value range as the operation continues.

However, if no maintenance is carried out in the specific time window, according to step S7 either an emergency program can be started or the machine is automatically stopped in order to prevent further damages. In the emergency program the operating conditions may be adjusted to obtain an uncritical dimension (e.g. conveyor speed).

It is also possible to logically combine several measuring parameters and their deviation with each other prior to step S5. This means, for instance, that a point in time or time window for a measure to be implemented on one or several wearing parts is only then assigned in accordance with step S5 if predetermined, e.g. at least two parameters deviate.

The invention claimed is:

1. A method for filling sausages with a paste-like substance with a filling machine, comprising:
    determining, by a sensor unit, at least one parameter that varies differently for different paste-like substances as a function of time; and
    depending on the at least one determined parameter, determining, by a controller, whether a measure for one or more wearing parts is necessary, the wearing parts wearing out at different times depending on the different paste-like substances.

2. The method according to claim 1, further comprising:
    detecting, by the controller, a deviation of at least one determined parameter from a respective set value or set value range.

3. The method according to claim 1, wherein the controller determines a point in time or a time window for the measure.

4. The method according to claim 3, further comprising:
    wherein, if it is determined that the point in time corresponds to an automatic measure and is reached, performing one or more of:
    starting, by the controller, an emergency program; and
    stopping, by the controller, the machine.

5. The method according to claim 1, further comprising:
    if the controller determines that a measure is necessary, performing one or more of the following:
    providing, by an acoustic indicator, an acoustic indication;
    providing, by a visual display, a visual indication takes;
    storing, to a computing device, data corresponding to the measure; and
    transmitting, to an external device, data corresponding to the measure.

6. The method according to claim 1, wherein the act of determining comprises:
    determining, by the controller, whether it is necessary for measures to be implemented on conveyor components of the filling machine.

7. The method according to claim 1, wherein the act of determining comprises:
    determining, by the controller, whether it is necessary for measures to be implemented on machine components of the filling machine.

8. The method according to claim 1, wherein the determined parameter comprises at least one of:
    pressure in a conveyor;
    pressure downstream of a conveyor;
    torque at a rotor;
    current consumption of a drive;
    power consumption of a drive;
    temperature of a motor;
    temperature of the paste-like substance;
    temperature of operating supplies;
    vibrations to detect an imbalance of a bearing;
    integrated measurement values of a drive speed;
    a number of revolutions of a drive;
    pressure difference between a suction area and a pressure area of a conveyor; and
    pressure difference between a suction area and a pressure area of a vacuum pump.

9. A filling machine, comprising:
    a sensor unit configured to determine at least one parameter that varies differently for different paste-like substances as a function of time; and
    a controller configured to, depending on the at least one measured parameter, determine whether a measure for one or more wearing parts is necessary, the wearing parts wearing out at different times depending on the type of the paste-like substance.

10. The filling machine according to claim 9, wherein the wearing part comprises:
    a conveyor component.

11. The filling machine according to claim 10, wherein the conveyor component includes one or more of:
    a rotor;
    a blade; and
    a sealing.

12. The filling machine according to claim 9, wherein the sensor unit comprises at least one of:
    a measuring device configured to measure the pressure in a conveyor;

a measuring device configured to measure the pressure downstream of a conveyor;
a device configured to determine torque acting on a rotor;
a device configured to determine current consumption of a drive;
a device configured to determine power consumption of a drive;
a device configured to determine temperature of the paste-like substance;
a device configured to determine temperature of a motor;
a device configured to determine temperature of operating supplies,
a vibration measuring device configured to detect an imbalance of a bearing;
a device configured to determine integrated measurement values of a conveyor drive speed;
a device configured to determine a number of revolutions of a drive;
a device configured to determine a pressure difference between the suction area and a pressure area of a conveyor; and
a device configured to determine a pressure difference between the suction area and a pressure area of a vacuum pump.

13. The filling machine according to claim 12, wherein the drive includes a conveyor drive.

14. The filling machine according to claim 9, wherein the filling machine includes one or more of:
a visual display configured to display an indication if and when a necessary measure is to be implemented on one or more wearing parts;
an acoustic device configured to provide an acoustic indication if and when a necessary measure is to be implemented on one or more wearing parts; and
a controller configured to perform one or more of:
storing data indicative of if and when a necessary measure is to be implemented on one or more wearing parts on a central computer; and
transmitting data indicative of if and when a necessary measure is to be implemented on one or more wearing parts to an external device.

15. The filling machine according to claim 9, wherein the controller comprises:
a memory configured to store one or more of:
parameters and parameter ranges corresponding to comparative values and corresponding points in time or time windows for measures to be implemented on one or more associated wearing parts.

16. The filling machine according to claim 9, wherein the measures to be implemented include one or more of:
conveyor components of the filling machine;
blades of the filling machine;
a sealing of the filling machine;
machine components of the filling machine;
a vacuum pump of the filling machine; and
an attachment of the filling machine.

* * * * *